(12) United States Patent
Van Der Schaar

(10) Patent No.: US 7,480,252 B2
(45) Date of Patent: Jan. 20, 2009

(54) METHOD AND SYSTEM FOR IMPROVING TRANSMISSION EFFICIENCY USING MULTIPLE-DESCRIPTION LAYERED ENCODING

(75) Inventor: Mihaela Van Der Schaar, Ossining, NY (US)

(73) Assignee: Koniklijke Philips Electronics N.V., Eindhoven (NL)

( * ) Notice: Subject to any disclaimer, the term of this patent is extended or adjusted under 35 U.S.C. 154(b) by 1295 days.

(21) Appl. No.: 10/264,906

(22) Filed: Oct. 4, 2002

(65) Prior Publication Data

US 2004/0066793 A1 Apr. 8, 2004

(51) Int. Cl.
*H04J 1/16* (2006.01)
*H04N 7/26* (2006.01)

(52) U.S. Cl. .................. 370/252; 370/465; 375/240.02
(58) Field of Classification Search .............. None
See application file for complete search history.

(56) References Cited

U.S. PATENT DOCUMENTS

| | | | | |
|---|---|---|---|---|
| 5,892,522 | A * | 4/1999 | Moutin ................... | 345/540 |
| 6,148,026 | A * | 11/2000 | Puri et al. ............... | 375/240 |
| 6,230,162 | B1 * | 5/2001 | Kumar et al. ............ | 707/104.1 |
| 6,275,531 | B1 * | 8/2001 | Li .......................... | 375/240.12 |
| 6,920,177 | B2 * | 7/2005 | Orchard et al. ......... | 375/240.12 |
| 6,925,120 | B2 * | 8/2005 | Zhang et al. ............ | 375/240.08 |
| 2001/0016070 | A1 | 8/2001 | Ohta ....................... | 382/199 |
| 2001/0016080 | A1 | 8/2001 | Goyal et al. ............ | 382/251 |
| 2003/0076858 | A1 * | 4/2003 | Deshpande ............. | 370/468 |
| 2003/0165274 | A1 * | 9/2003 | Haskell et al. .......... | 382/243 |
| 2003/0202579 | A1 * | 10/2003 | Lin et al. ................. | 375/240.03 |
| 2004/0005095 | A1 * | 1/2004 | Wu et al. ................. | 382/238 |
| 2004/0024594 | A1 * | 2/2004 | Lee et al. ................ | 704/219 |
| 2004/0071083 | A1 * | 4/2004 | Li et al. ................... | 370/230 |
| 2004/0139219 | A1 * | 7/2004 | Radha ..................... | 709/234 |
| 2004/0261113 | A1 * | 12/2004 | Paul et al. ............... | 725/90 |
| 2005/0147164 | A1 * | 7/2005 | Wu et al. ................. | 375/240.12 |
| 2005/0195895 | A1 * | 9/2005 | Wu et al. ................. | 375/240.1 |
| 2006/0064501 | A1 * | 3/2006 | Harris et al. ............ | 709/232 |

(Continued)

FOREIGN PATENT DOCUMENTS

WO WO0130085 4/2001

(Continued)

OTHER PUBLICATIONS

Wireless video transport using path diversity: multiple description v. layered coding, by Yao Want et al, International Conference on Image Processing, IEEE, vol. 2 or 3, Sep. 22, 2002, pp. 21-24, XP010607250.

(Continued)

*Primary Examiner*—Andrew Lee

(57) ABSTRACT

A method, system and apparatus for improving network transmission efficiency using MDS and Fine Granular Spatial coding is disclosed. In accordance with the method, a video image is partitioned into a plurality of information item frames, each frame is independently layer encoded into a base layer and an enhancement layer, at least one channel of the communication is then selected, each of the base layers are associated with one of the selected communication channels, and each base layer is transmitted over the associated communication channel. In other aspect, a residual bandwidth is determined on each associated channel and a level of an associated enhancement layer comparable to the residual bandwidth is transmitted over the associated channel.

17 Claims, 8 Drawing Sheets

U.S. PATENT DOCUMENTS

2006/0200848 A1* 9/2006 Baldine-Brunel et al. ..... 725/90
2006/0256867 A1* 11/2006 Turaga et al. .......... 375/240.16
2007/0030893 A1* 2/2007 Chen ....................... 375/240.1

FOREIGN PATENT DOCUMENTS

WO     WO0139503     5/2001

OTHER PUBLICATIONS

Transmission of multiple description and layered video over an AGPRS wireless network, by Reibman et al, International Conference on Image Proc essing, vol. 2, Sep. 10-13, 2002, pp. 136-139, XP010529942.

Content-based selective enhancement for streaming video by Van der Schaar et al, International Conference of Image Processing, IEEE, vol. 1 or 3, Conf. 8, Oct. 7, 2001, pp. 977-980.

* cited by examiner

METHOD AND SYSTEM FOR IMPROVING TRANSMISSION EFFICIENCY USING MULTIPLE-DESCRIPTION LAYERED ENCODING

FIELD OF THE INVENTION

The present invention is directed to video transmission over a communication network and more specifically to transmission of video images using Multiple-Description and Layered encoding.

BACKGROUND OF THE INVENTION

Multiple Description Coding (MDC) is known in the art to be an effective technique for robust communication over networks, such as wireless networks that are subjected to multipath interference and Doppler diversity. MDC is also employed in transmission of data distributed over a plurality of disk drives, e.g., Redundant Arrays of Inexpensive Disks (RAIDS), and the Internet. Several types of MDC coding schemes are known. For example, Servetto, et al., teach scalar quantization, in "Multiple Description Lattice Vector Quantization," Proceedings of the IEE Data Compression Convergence (DCC), Snowbird, Utah., March 1999. Y. Wang, et al., teach correlating transforms in "Multiple Description Coding using Pairwise Correlating Transforms," January 1999. Goyal, Vetteri, et al., teach frame expansion in "Multiple Description Transform Coding: Robustness to Erasures Using Tight Frame Expansion," August 1998. Puri et al., teach Forward Error Correction (FEC) in "Forward Error Correction (FED) Codes Based on Multiple Description Coding for Internet Video Streaming and Multicast Signal Processing," Image Communication, Vol. 16, No. 8, pp. 745-762, May 2001.

FIG. 1 illustrates an MDC method 100 proposed by J. G. Apostolopoulos in "Reliable Video Communication Over Lossy Packet Networks using Multiple State Encoding and Path Diversity," Visual Communications and Image Processing (VCIP), pp. 392-409, January 2001, wherein video data composed of a plurality of image frames, represented as 110a, 110b, 110c, are split into odd frames, represented as 121, 123, 125, of information and even frames, represented as 122, 124, 126, of information. The video information in each odd and even frame is then independently coded using known encoding techniques, such as MPEG, etc. The coded information in each odd and even frame may then be transmitted over a network using the same or different channels. In this latter case, the time to transmit an entire image may be significantly reduced. As would be appreciated, the information referred to as "odd" and "even" may, for example, be information associated with "odd" and "even" rows of video data in a video image.

In the current state-of-the-art, MDC encoding algorithms assume that at least one channel is operating at a maximum bit-rate or bandwidth. However, this assumption does not consider that the network bandwidth varies over time and could fall below a level suitable for MDC coded images. In such a case, the transmitted images are not properly decoded and the image quality at the receiver may be sufficiently degraded to render the image un-viewable.

Accordingly, there is a need for a method of MDC coding that is responsive to the varying amount of available network bandwidth and can dynamically adjust the transmission rate to accommodate available network bandwidth.

SUMMARY OF THE INVENTION

A method, system and apparatus for improving network transmission efficiency using MDS and layered coding, and Fine Granular Spatial encoding, in particular, is disclosed. In accordance with the method, a video image is partitioned into a plurality of information item frames, each frame is independently layer encoded into a base layer and an enhancement layer, at least one channel of the communication is then selected, each of the base layers are associated with one of the selected communication channels, and each base layer is transmitted over the associated communication channel. In other aspect, a residual bandwidth is determined on each associated channel and a level of an associated enhancement layer comparable to the residual bandwidth is transmitted over the associated channel.

BRIEF DESCRIPTION OF THE DRAWINGS

FIGS. 1 through 8 and the accompanying detailed description contained herein are to be used as illustrative embodiments of the present invention and should not be construed as the only manner of practicing the invention. It is to be understood that these drawings are for purposes of illustrating the concepts of the invention and are not to scale. It will be appreciated that the same reference numerals, possibly supplemented with reference characters where appropriate, have been used throughout to identify corresponding parts.

DETAILED DESCRIPTION OF THE INVENTION

Figure 1:
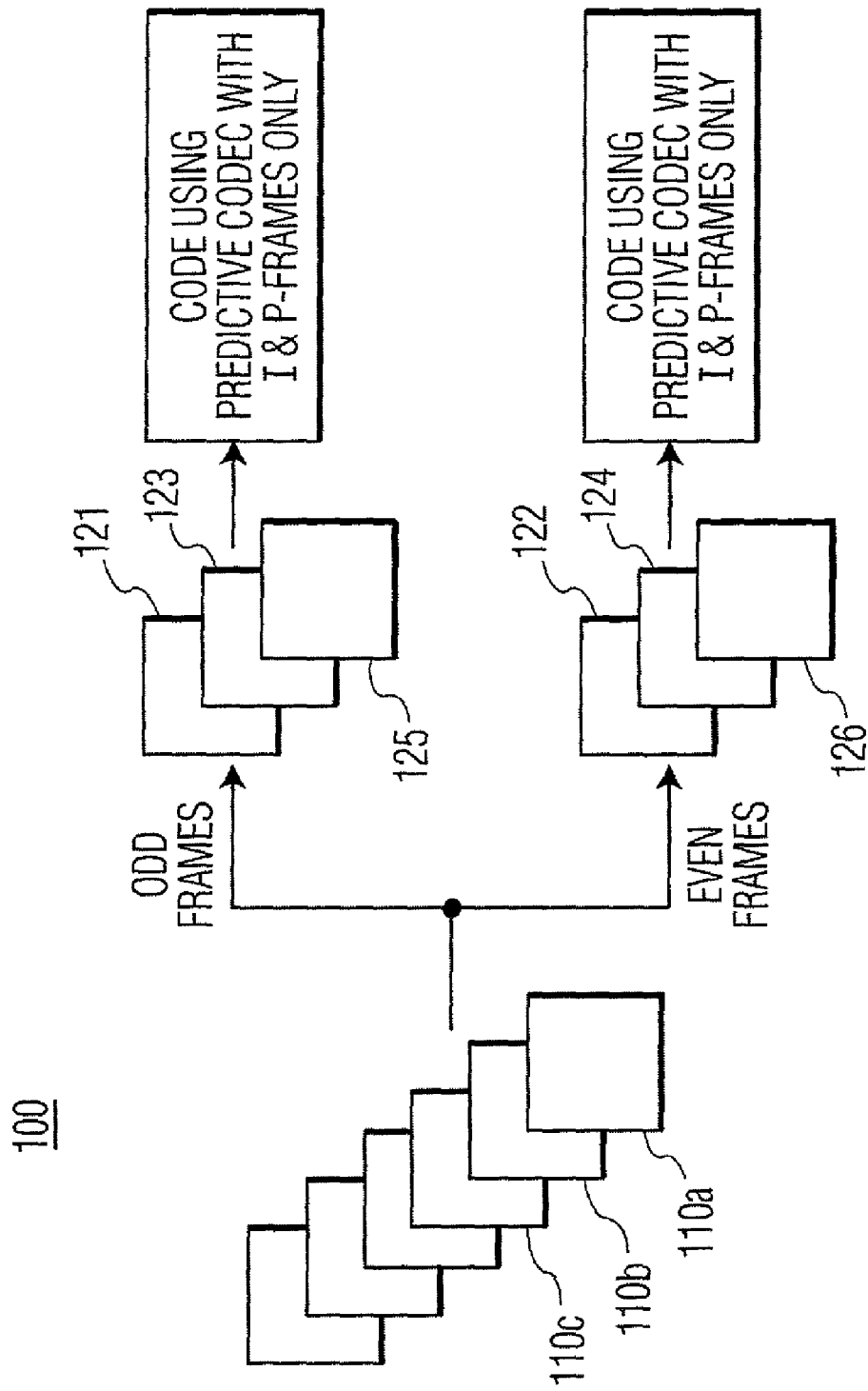
FIG. 1 illustrates a conventional MDC encoding system.
Figure 2:
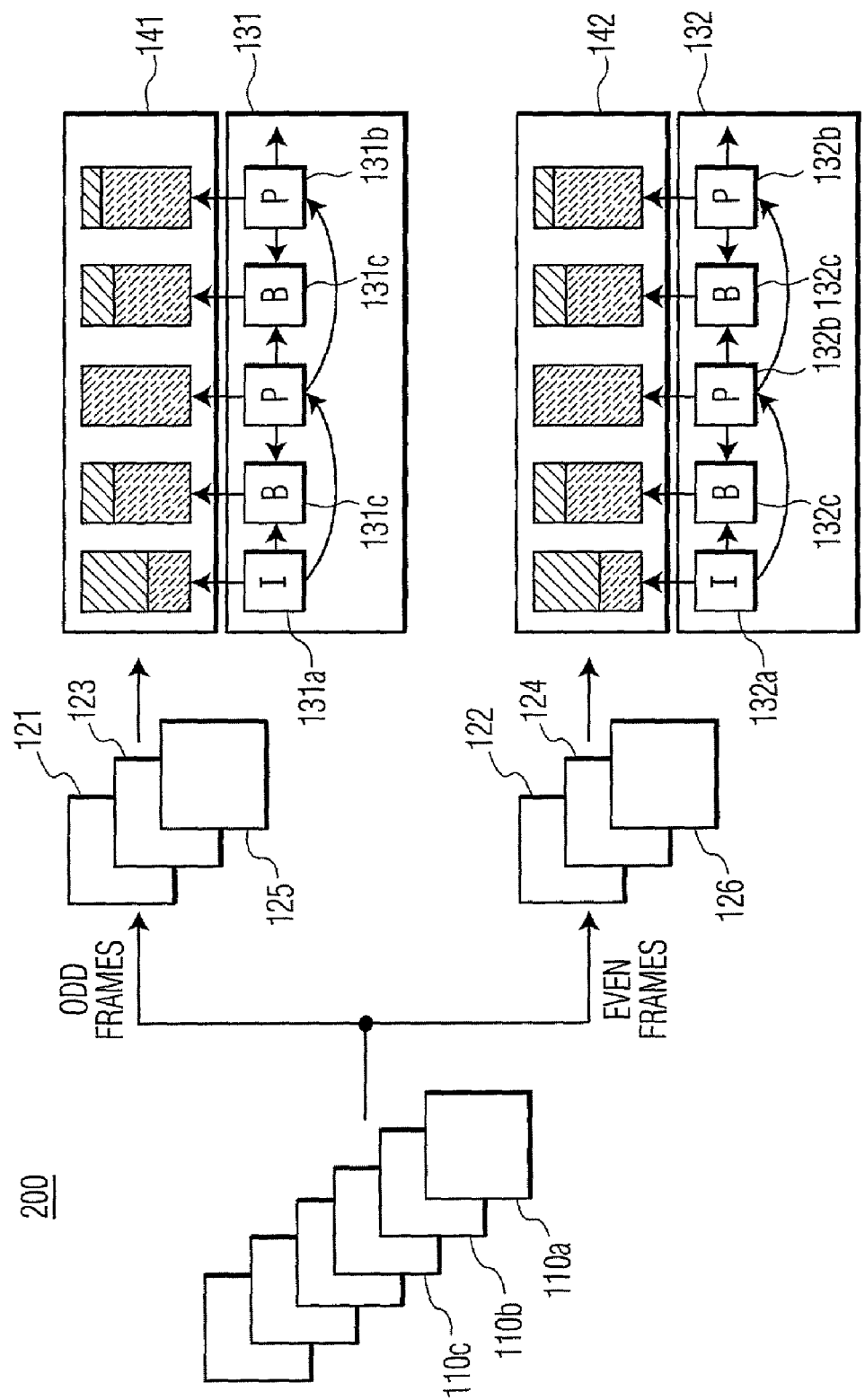
FIG. 2 illustrates an MDC encoding system in accordance with the principles of the present invention.

FIG. 2 illustrates an exemplary method 200 for encoding of video images using MCD/FGS encoding in accordance with the principles of the invention. In this exemplary method, video images 110a, 110b, 110c are divided, split or partitioned into frames containing information items referred to as "odd", represented as 121, 123, 125, respectively, and frames containing information items referred to as "even" represented as 122, 124, 126, respectively, as previously described. It will be appreciated that the information in odd frame 121 and even frame 122 when combined is representative of the information in video image 110a. The "odd" information items contained in frames 121, 123, 125 are independently layer encoded using, for example, and preferably, Fine Granular Scaled (FGS) encoding methods. FGS encoding is well known in the art and is disclosed in detail, for example, in U.S. Pat. No. 6,292,512, entitled "Scalable Video Coding System," issued Sep. 18, 2001. Although, FGS encoding is preferred, it will be understood by those skilled in the art to use other layered encoding methods.

Each of the frames containing "odd" information items, for example 121, is encoded into a base layer 131 and an enhancement layer 141. Base layer 131 is representative of a minimal digital representation of the image and contains sufficient information to satisfy the lowest level of quality, i.e., lowest resolution, of the original image when transmitted over the network. Base layer 131 is composed of I-frames 131a, P-frames 131b, and B-frames 131c, as is known.

Enhancement layer 141 contains information to improve the quality of the transmitted image information by containing information regarding a difference between the original image and the minimal digital image contained in a corresponding I-frame 131a, P-frame 131b and B-frame 131c. Encoded information items contained in enhancement layer 141 may be transmitted in conjunction with the base layer information to improve the image quality of the corresponding base layer 131 frame 131a, 131b, and/or 131c based on the amount residual bandwidth between the available network bandwidth and the base layer bandwidth. Hence, only that portion of a corresponding enhancement layer that occupies the residual bandwidth may be transmitted. Information items contained in the frames, referred to as "even", for example 122, are similarly FGS encoded into base layer 132 and enhancement layer 142, and similarly transmitted.

Figure 3:
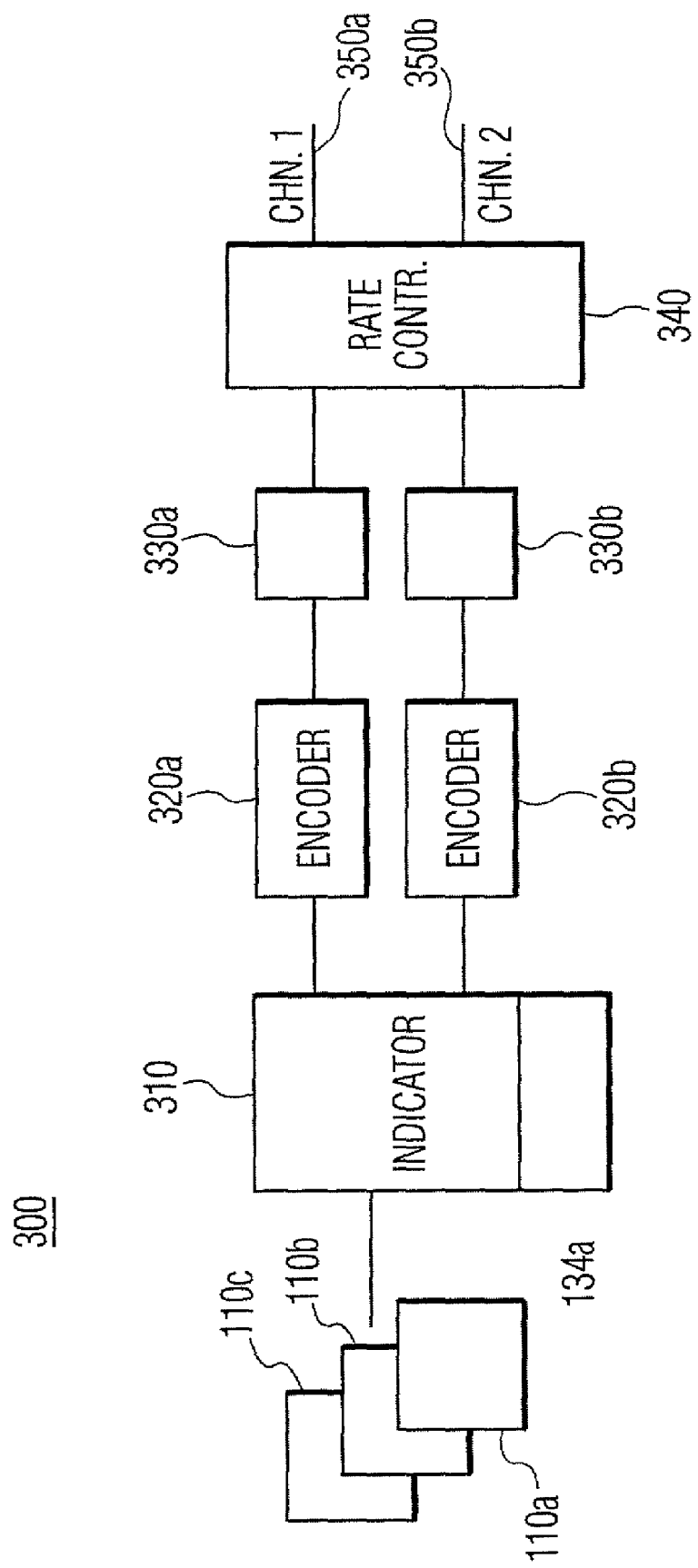
FIG. 3 illustrates a block diagram of a system for MDC/FGC encoding in accordance with the principles of the present invention.

FIG. 3 illustrates a block diagram of a system 300 for MDC/FGS encoding in accordance with the principles of the present invention. In this illustrated example, video image 110a, 110b, 110c, are supplied to frame indicator 310, which determines or identifies whether an odd frame or an even frame of information items is being processed. Odd frame information is next applied to a conventional FGS encoder 320a, which FGS encodes odd frame information using known FGS encoding methods. Similarly, even frame information is applied, in this illustrated case, to a second conventional FGS encoder 320b, which FGS encodes the even frame information using the same known FGS encoding methods.

FGS encoded frame information is then stored in storage media 330a, 330b based on whether the frame is indicated or identified to be an odd or even frame. Rate controller 340 may then access storage media 330a, 330b, independently, to output the accessed data over at least one transmission channel 350a, 350b. It would be appreciated that the same transmission channel may be used to transmit each base layer.

Although not shown, it will be appreciated that, system 300 may include only a single FGS encoder that may independently encode both odd frame and even frame information items. In this embodiment, the FGS encoder identifies whether an odd frame or even frame is being processed and applies the information item appropriately to a next corresponding odd or even frame to create predicted P- and B-frames and corresponding enhancement layer frames. The processing of this single encoder maintains a distinction between odd and even frame processing to insure proper determination of the predicted P- and B-frames. This distinction of odd and even frame information items may be made by an identification "flag" or "tag" placed within the data by indicator unit 310.

In another aspect of the invention (not shown), the encoded odd and even frame information may be serially stored on a storage medium. Rate controller 340 may then access a single storage medium and determine, based on a frame identifier, flag or tag, over which at least one selected communication channel the accessed information items may be transmitted.

Figure 4:
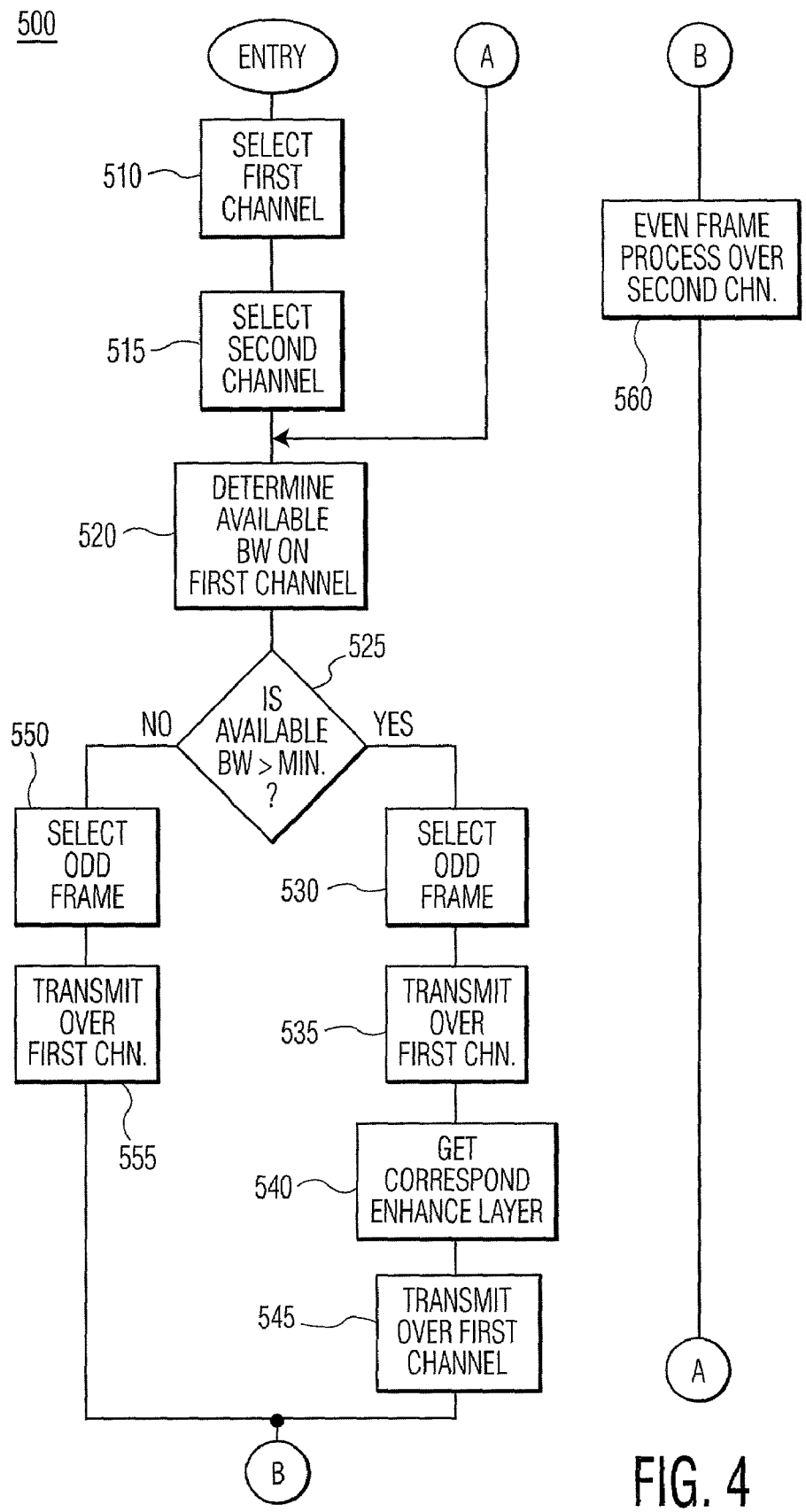
FIG. 4 illustrates a flow chart of a first exemplary process for transmitting MDC/FGS encoded images in accordance with the principles of the present invention.

FIG. 4 illustrates a flow chart of an exemplary transmission process 500 in accordance with one aspect of the present invention. In this exemplary process, a first channel is selected for transmission of odd frame information, at block 510 and a second channel is selected for transmission of even frame information at block 515.

At block 520, the available bandwidth on the first selected channel is determined. At block 525 a determination is made whether the available bandwidth is greater than a minimum bandwidth. If the answer is in the affirmative, a base layer 131 frame associated with a first/next odd frame of information is selected at block 530 and transmitted over the selected first channel at block 535. At block 540, a level of enhancement layer 141 associated with the selected odd frame and corresponding to the available bandwidth greater than the minimum bandwidth, i.e., residual bandwidth, is determined. At block 545, the determined level of enhancement layer 141 is transmitted over the selected first channel. Processing then continues at block 560 to perform a substantially similar operation on even frames of FGS encoded information items.

However, if the determination at block 525 is negative, then a base layer 131 frame associated with a first/next odd frame is selected at block 550 and transmitted over the selected first channel at block 555.

It will be appreciated that similar processing is executed substantially concurrently, or serially, for information contained in even frames over the selected second channel at block 560.

Processing then continues at 520 to process information in the next odd and/or even frame.

In accordance with this aspect of the invention, the video stream is adapted to transmit information based on the available bandwidth of the two selected channels. In the case of the receiving system receiving information on a single channel, then the video image is reconstructed at one-half the frame rate. However, as the bandwidth of the signal receiving channel varies, the FGS encoded information will allow for higher resolution of the received images, dynamically.

In another aspect of the invention (not shown), it will be appreciated that processing may continue at block 510 rather than block 520. In this aspect a new first and second channel may be dynamically selected for each frame transmitted.

Figure 5:
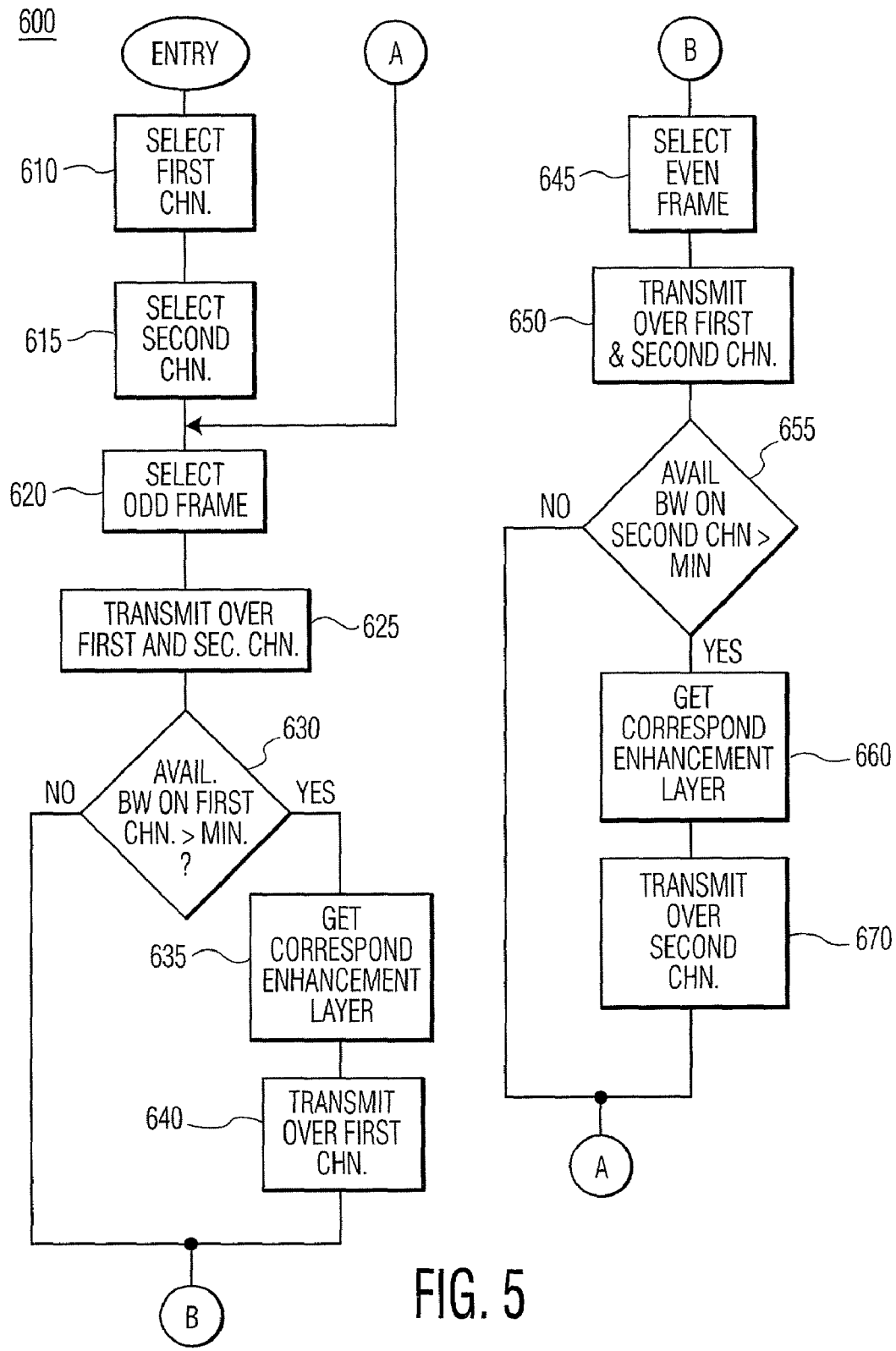
FIG. 5 illustrates a flow chart of a second exemplary process for transmitting MDC/FGS encoded images in accordance with the principles of the present invention.

FIG. 5 illustrates a flow chart of a second exemplary transmission process 600 in accordance with the principles of the present invention. In this exemplary process, a first channel is selected at block 610 and a second channel is selected at block 615. At block 620 a first/next odd frame is selected for transmission over the selected first and second channels, at block 625. At block 630, a determination is made whether the available bandwidth on the first selected channel is greater than a minimum bandwidth. If the answer is in the affirmative, then at block 635, a level of enhancement layer 141 corresponding to the available bandwidth greater than the minimum bandwidth, i.e., residual bandwidth, and associated with the selected odd frame is selected and transmitted, at block 640, over the selected first channel. Processing then continues at block 655.

However, if the determination at block 630 is negative, then a frame of base layer 142 associated with a first/next even frame is selected at block 645 and transmitted, at block 650, over the selected first channel and second channels.

At block 655, a determination is made whether the available bandwidth of the second selected channel is greater than a minimum bandwidth. If the answer is in the affirmative, then a level of enhancement layer 142 corresponding to the determined available bandwidth greater than minimum bandwidth and associated with the selected even frame is determined at block 660 and transmitted, at block 670, over the selected second channel.

Processing then continues at block 620 to select a next/subsequent odd frame for processing. In another aspect of the invention (not shown), it will be appreciated that processing may continue at block 610 rather than block 620. In this aspect, a new first and second channel may be dynamically selected for each frame transmitted.

Figure 6:
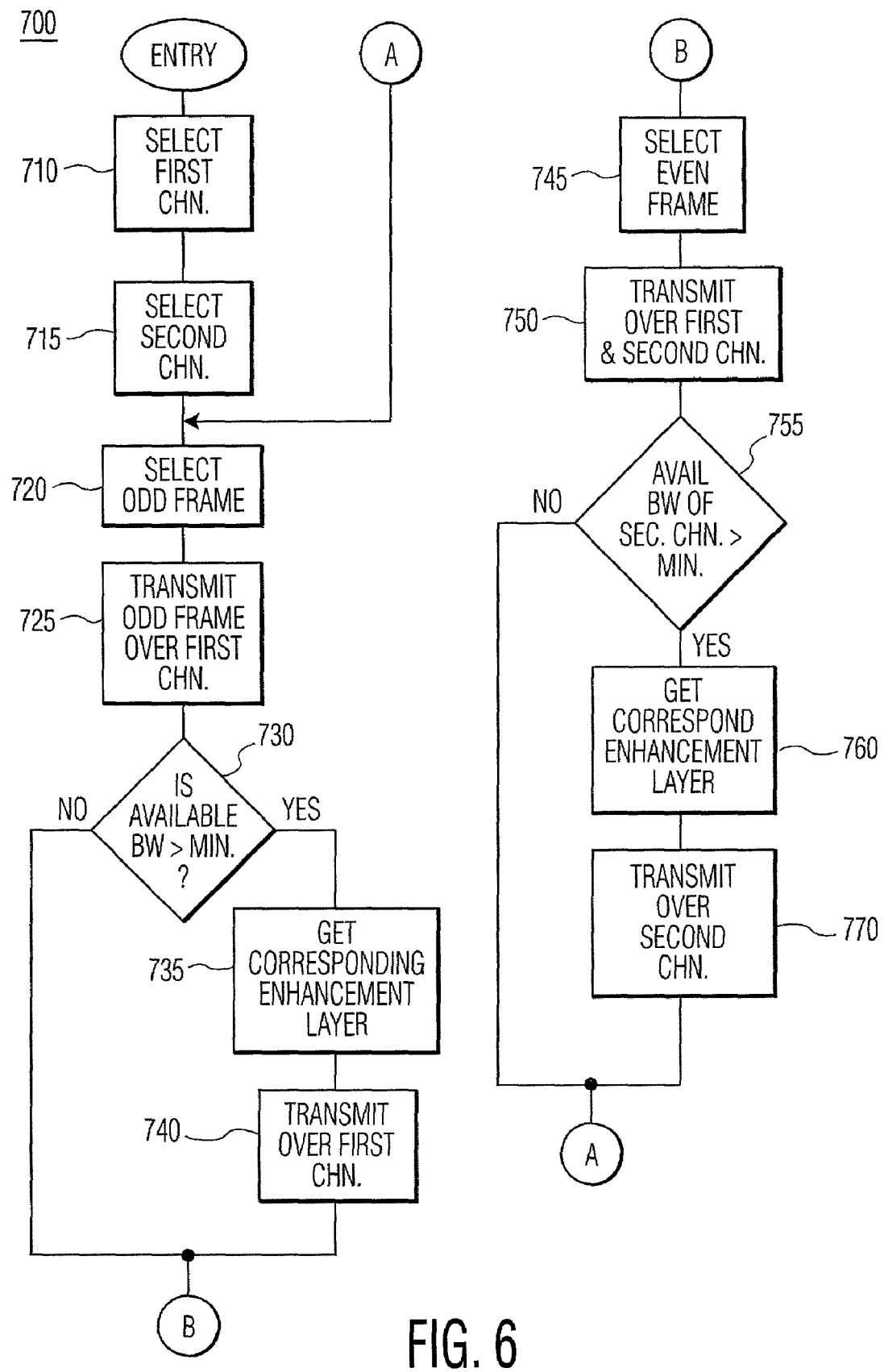
FIG. 6 illustrates a flow chart of a third exemplary process for transmitting MDC/FGS encoded images in accordance with the principles of the present invention.

FIG. 6 illustrates a flow chart of a third exemplary transmission process 700 in accordance with the principles of the present invention. In this exemplary process, a first channel is selected at block 710 and a second channel is selected at block 715. At block 720 a frame of base layer 131 associated with a first/next odd frame of information is selected for transmission, at block 725, over the selected first channel. At block 730, a determination is made whether the available bandwidth on the first selected channel is greater than a minimum bandwidth. If the answer is in the affirmative, then at block 735, a level of enhancement layer 141 corresponding to the available bandwidth greater than the minimum bandwidth and associated with the selected odd frame, is selected and transmitted, at block 740, over the selected first channel.

However, if the determination at block 730 is negative, then a frame of base layer 142 associated with a first/next even frame of information is selected at block 745 and transmitted, at block 750, over the selected first channel and second channels.

At block 755, a determination is made whether the available bandwidth on the second selected channel is greater than a minimum bandwidth. If the answer is in the affirmative, then a level of enhancement layer 142 corresponding to the determined available bandwidth greater than minimum bandwidth and associated with the selected even frame is determined at block 760 and transmitted, at block 770, over the selected second channel.

Processing then continues at block 720 to select a next/subsequent odd frame for processing. In another aspect of the invention (not shown), it will be appreciated that processing may continue at block 710 rather than block 720. In this aspect, a new first and second channel may be dynamically selected for each frame transmitted.

Figure 7:
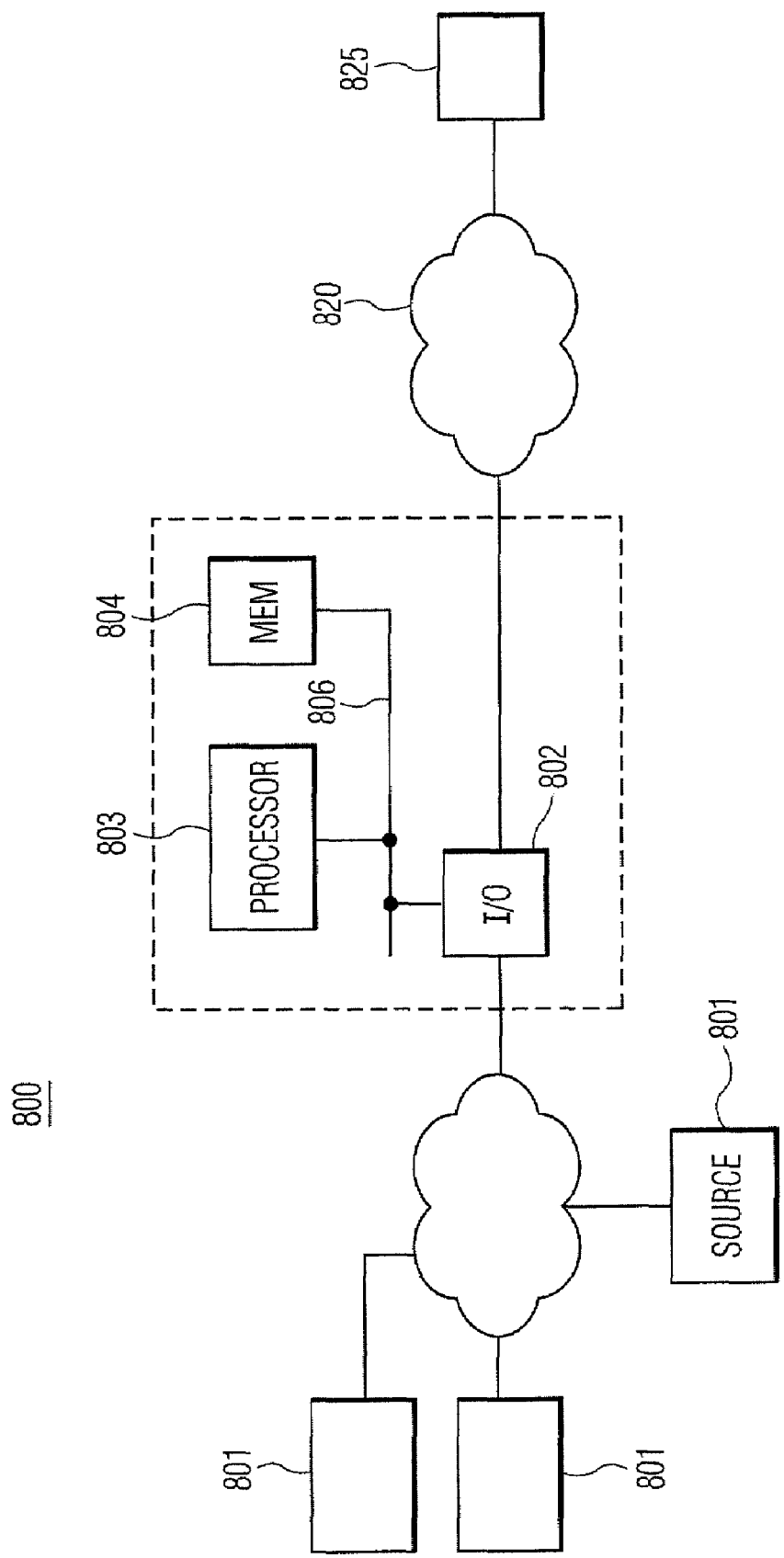
FIG. 7 illustrates an exemplary system for transmitting MDC/FGS encoded images in accordance with the principles of the present invention.

FIG. 7 illustrates an exemplary embodiment of a system 800 that may be used for implementing the principles of the present invention. System 800 may represent a desktop, laptop or palmtop computer, a personal digital assistant (PDA), a video/image storage apparatus such as a video cassette recorder (VCR), a digital video recorder (DVR), a TiVO apparatus, etc., as well as portions or combinations of these and other devices. System 800 may contain one or more input/output devices 802, processors 803 and memories 804, which may access one or more sources 801 that contain FGS encoded structures of video images. Sources 801 may be stored in permanent or semi-permanent media such as a television receiver, a VCR, RAM, ROM, hard disk drive, optical disk drive or other video image storage devices. Sources 801 may alternatively be accessed over one or more network connections for receiving video from a server or servers over, for example a global computer communications network such as the Internet, a wide area network, a metropolitan area network, a local area network, a terrestrial broadcast system, a cable network, a satellite network, a wireless network, or a telephone network, as well as portions or combinations of these and other types of networks.

Input/output devices 802, processors 803 and memories 804 may communicate over a communication medium 806. Communication medium 806 may represent for example, a bus, a communication network, one or more internal connections of a circuit, circuit card or other apparatus, as well as portions and combinations of these and other communication media. Input data from the sources 801 is processed in accordance with one or more software programs that may be stored in memories 804 and executed by processors 803 in order to supply FGS encoded video images to network 820, which may be received by device 825, such as a receiving system or a display system. Processors 803 may be any means, such as general purpose or special purpose computing system, a laptop computer, desktop computer, handheld computer, or may be a hardware configuration, such as dedicated logic circuit, integrated circuit, Programmable Array Logic (PAL), Application Specific Integrated Circuit (ASIC), etc., that provides a known output in response to known inputs.

In a preferred embodiment, the coding and decoding employing the principles of the present invention may be implemented by computer readable code executed by processor 803. The code may be stored in the memory 804 or read/downloaded from a memory medium such as a CD-ROM or floppy disk. In one aspect, memory 804 may be integrated with processor 803, conventionally referred to as a cache memory. In other embodiments, hardware circuitry may be used in place of, or in combination with, software instructions to implement the invention. For example, the elements illustrated herein may also be implemented as discrete hardware elements.

Furthermore, the term computer or computer system may represent one or more processing units in communication with one or more memory units and other devices, e.g., peripherals, connected electronically to and communicating with at least one processing unit.

Figure 8:
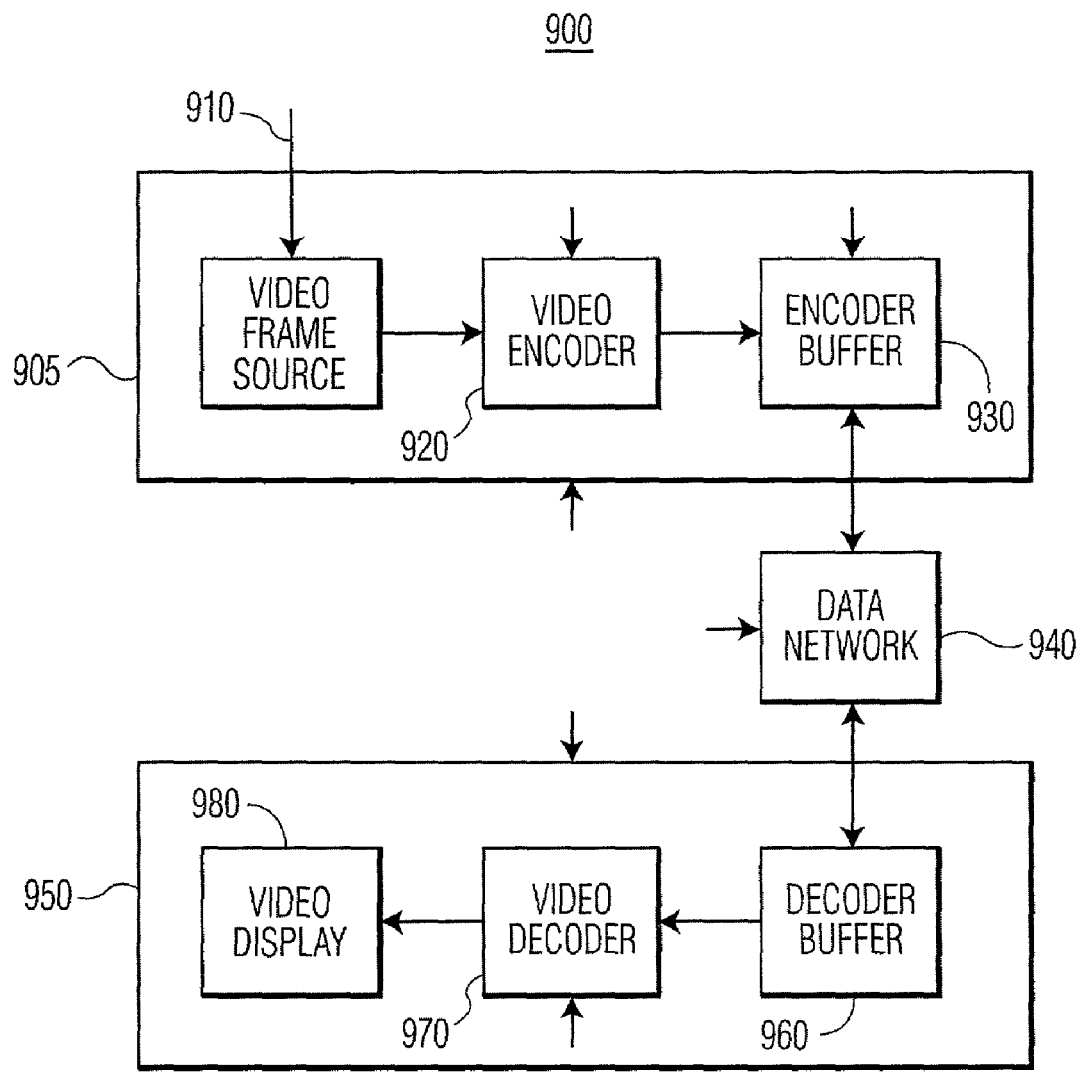
FIG. 8 illustrates an exemplary system for transmitting and receiving MDC/FGS encoded images in accordance with the principles of the invention.

FIG. 8 illustrates a typical transmission system 900 utilizing the present invention. At transmitter site 905, video data is provided by video frame source 910 to video encoding unit 920. Video encoding unit 920 includes parts of encoder system 300 illustrated in FIG. 3. Video encoded data is then stored in encoder buffer 930 for transmission over data network 940. At receiving system 950, the received data frames are stored in decoder buffer 960 and provided to video decoder 970. Video decoder 870 similar to encoder 300 includes a processor and memory, which may execute code that extracts information items regarding the transmitted information to decode a current transmission frame and merge or rejoin decoded received images to create an image representative of the originally transmitted image The decoded reconstructed image may then presented on video display 980.

While there has been shown, described, and pointed out, fundamental novel features of the present invention, it will be understood that various omissions and substitutions and changes in the invention described, in the form and details of the methods and devices disclosed, and in their operation, may be made by those skilled in the art without departing from the spirit of the present. For example, while the description has referred to odd frames of information items associated with a first selected channel and even frames of information items, it would be within the scope of those skilled in the art to practice associating even frames of information with a first channel and odd frames of information with a second channel. Furthermore, it would be understood that although only odd and even frames of information items are illustrated, it would within the ability of one skilled in the art to partition a video image into a plurality of frames of information items representative, for example, of alternate odd and even information in rows or columns. Similarly, although a first and second channels are illustrated, it would be within the ability of one skilled in the art to develop a system using a plurality of channels and transmitting information over a plurality of channel. Or, further still, one skilled in the art may use only a single channel and transmit alternate frames of odd and even information of the selected single channel.

Although, information items are illustrated as being extracted from the video image, e.g., frame 110*a* and physically separated frames 121, 122, it would be within the ability of one skilled in the art to identify or "flag" or "tag" appropriate information items, e.g., "odd" and "even" rows or columns, within the image and retain the identified information items within the image rather than physically deconstruct the image as illustrated. Furthermore, although in the embodiment illustrated, information items are associated with "odd" and "even" information, it would be appreciated that the identification of information items may be associated with portions of the image. For example, contiguous rows representative of a top-half and bottom-half of the image. Or contiguous columns that are representative of left- and right-halves of the image. Further still, the identification of the image may be based on contiguous rows that are representative of quarters and/or eights of the original image.

It is further expressly intended that all combinations of those elements that perform substantially the same function in substantially the same way to achieve substantially the same result are within the scope of the invention. Substitutions of elements from one described embodiment to another are also fully intended and contemplated.

What is claimed is:

1. A method for improving transmission efficiency of video images over a network having a plurality of communication channels, comprising:
    encoding each information item frame of the video images using layered encoding, wherein said each information item frame is encoded into a base layer and an enhancement layer;
    associating a first base layer with at least a first communication channel of the plurality of communication channels;
    associating a second base layer with at least a second communication channel of the plurality of communication channels, the second communication channel being different from the first communication channel; and
    transmitting the first and second base layers over the associated communication channels.

2. The method as recited in claim 1, including:
    determining a channel bandwidth associated with the first communication channel;
    determining a residual channel bandwidth based on the channel bandwidth and an associated base layer bandwidth of a current information item frame; and
    transmitting over the first communication channel a level of the enhancement layer of the current information item frame comparable to the residual channel bandwidth.

3. The method as recited in claim 1, including partitioning the image into the plurality of information item frames by identifying known areas of the image.

4. The method as recited in claim 3, wherein said known areas are selected from the group comprising: rows, columns, diagonals, odd row, even rows, odd columns, even columns alternate odd rows, alternate even rows, alternate odd columns, alternate even columns, a contiguous plurality of rows, a contiguous plurality of columns.

5. The method as recited in claim 1, wherein said layer encoding is FGS encoding.

6. The method as recited in claim 1, wherein each of said base layers is associated with the same selected communication channel.

7. A system for improving transmission efficiency of video images over a network having a plurality of communication channels, comprising:
    a transmitter that is configured to transmit information items over at least a first and second communication channel, the transmitter including at least one processor in communication with a memory that is configured to execute code for:
    encoding each frame of information items of the video images using layered encoding, wherein each of said information item frames is encoded into a base layer and an enhancement layer;
    associating at least one base layer with the first communication channel, and at least one other base layer with the second communication channel; and
    transmitting the base layers over the associated communication channels.

8. The system as recited in claim 7, wherein the processor is configured to execute code for:
    determining a channel bandwidth associated with the first communication channel;
    determining a residual channel bandwidth based on the channel bandwidth and an associated base layer bandwidth of a current information item frame; and
    transmitting over the first communication channel a level of the enhancement layer of the current information item frame comparable to the residual bandwidth.

9. The system as recited in claim 7, wherein the processor is configured to partition the video images into the information item frames by identifying known areas of said image.

10. The system as recited in claim 9, wherein said known areas are selected from the group comprising: rows, columns, diagonals, odd row, even rows, odd columns, even columns alternate odd rows, alternate even rows, alternate odd columns, alternate even columns, a contiguous plurality of rows, a contiguous plurality of columns.

11. The system as recited in claim 7, further comprising:
    a receiver that is configured for receiving encoded information transmitted over at least one of the communication channels, the receiving system including a processor in communication with a receiving memory that is configured to execute code for:
    identifying the received information; and
    organizing the identified frames into video images.

12. The system as recited in claim 11, wherein the processor is configured to execute code for displaying said video images.

13. The system as recited in claim 7, wherein said code is stored in said receiving memory.

14. The system as recited in claim 11, wherein said code is stored in said receiving memory.

15. A method for improving transmission efficiency of video images over a network having at least one communication channel, comprising:
    partitioning each of the video images into a plurality of information item frames corresponding to predefined areas of the video images;
    encoding each of said information item frames using layered encoding, wherein each of said frames is encoded into a base layer and an enhancement layer;

selecting at least one of the at least one communication channels;

associating each of the base layers with at least one of the selected at least one communication channels; and transmitting the base layers over the associated communication channel.

16. The method as recited in claim 15, wherein the predefined areas are selected from a group comprising: rows, columns, diagonals, odd row, even rows, odd columns, even columns alternate odd rows, alternate even rows, alternate odd columns, alternate even columns, a contiguous plurality of rows, a contiguous plurality of columns.

17. The method as recited in claim 15, including:

determining a channel bandwidth associated with the at least one communication channel;

determining a residual channel bandwidth based on the channel bandwidth and an associated base layer bandwidth of a current information item frame; and transmitting over the at least one communication channel a level of the enhancement layer of the current information item frame comparable to the residual channel bandwidth.

* * * * *